(12) United States Patent
Coleman

(10) Patent No.: US 11,783,441 B2
(45) Date of Patent: Oct. 10, 2023

(54) SYSTEMS AND METHODS FOR DYNAMICALLY CONNECTING ONE OR MORE TRANSPORTATION VEHICLES TO CUSTOMERS

(71) Applicant: Ford Global Technologies, LLC, Dearborn, MI (US)

(72) Inventor: Jonathan H. Coleman, Saline, MI (US)

( * ) Notice: Subject to any disclaimer, the term of this patent is extended or adjusted under 35 U.S.C. 154(b) by 576 days.

(21) Appl. No.: 16/581,073

(22) Filed: Sep. 24, 2019

(65) Prior Publication Data

US 2021/0090197 A1    Mar. 25, 2021

(51) Int. Cl.
| | |
|---|---|
| *G06Q 50/30* | (2012.01) |
| *H04W 4/024* | (2018.01) |
| *H04W 4/40* | (2018.01) |
| *H04W 4/029* | (2018.01) |
| *G06V 40/16* | (2022.01) |

(52) U.S. Cl.
CPC .......... *G06Q 50/30* (2013.01); *G06V 40/172* (2022.01); *H04W 4/024* (2018.02); *H04W 4/029* (2018.02); *H04W 4/40* (2018.02)

(58) Field of Classification Search
CPC ...... G06Q 50/30; H04W 4/024; H04W 4/029; H04W 4/40; G06V 40/172
See application file for complete search history.

(56) References Cited

U.S. PATENT DOCUMENTS

| | | | | |
|---|---|---|---|---|
| 2017/0343375 | A1* | 11/2017 | Kamhi | G01C 21/20 |
| 2018/0039917 | A1* | 2/2018 | Buttolo | G06Q 10/0631 |
| 2018/0202820 | A1* | 7/2018 | Yu | G01C 21/3438 |
| 2019/0244498 | A1* | 8/2019 | Dumas | G08B 13/19656 |
| 2020/0349345 | A1* | 11/2020 | Hodge | G06Q 50/30 |

OTHER PUBLICATIONS

M. Faisal and A. Thakur, "Autonomous car system using facial recognition and geo location services," 2016 6th International Conference—Cloud System and Big Data Engineering (Confluence), Noida, India, 2016, pp. 417-420, doi: 10.1109/CONFLUENCE.2016.7508155. (Year: 2016).*
Hamanaka, Karl, "Rivian's Latest Patent Application Wants to Help Find You in a Crown," Sourcing Journal, Jul. 7, 2022.

* cited by examiner

*Primary Examiner* — Jeff Zimmerman
*Assistant Examiner* — Wayne S. Murray
(74) *Attorney, Agent, or Firm* — Brandon Hicks; Eversheds Sutherland (US) LLP

(57) ABSTRACT

Systems and methods are provided herein for connecting a transportation vehicle to a customer. This process may involve receiving a digital identifier of a user at a particular location, where the digital identifier may be obtained by one or more video capture devices. Such devices may be located in an environment of the one or more ridehail vehicles and the user and/or located on the one or more ridehail vehicles themselves. The process may also involve determining a ridehail vehicle to assign to the user based on the digital identifier indicating the user is at the particular location.

17 Claims, 3 Drawing Sheets

SYSTEMS AND METHODS FOR DYNAMICALLY CONNECTING ONE OR MORE TRANSPORTATION VEHICLES TO CUSTOMERS

TECHNICAL FIELD

The present disclosure relates to systems and methods for dynamically connecting one or more transportation vehicles to customers and more particularly to connecting one or more ridehail vehicles to customers.

BACKGROUND

Modern ridehail services typically connect a specific ridehail vehicle to a requesting customer based on a relative location of the customer to the ridehail vehicle. A number of problems arise with this methodology. For example, a situation may arise where a ridehail vehicle and a customer are in relatively close proximity, but the ridehail vehicle is located in a congested area. Thus, it may be difficult for the ridehail vehicle to reach the customer. As another example, even if congestion is limited, the customer might experience difficulty in locating the ridehail vehicle, for example, in an city that is not familiar to the customer, or if the customer has a vision or other type of impairment. As a third example, this connection method does not meet the dynamic needs of the ridehail vehicle or the customer as the customer may not remain stationary in one location (e.g., the customer is walking down the street), and more accessible ridehail vehicles may be available, but the customer remains connected to the original ridehail vehicle. These are merely a few exemplifications of issues that arise with the current arrangement.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
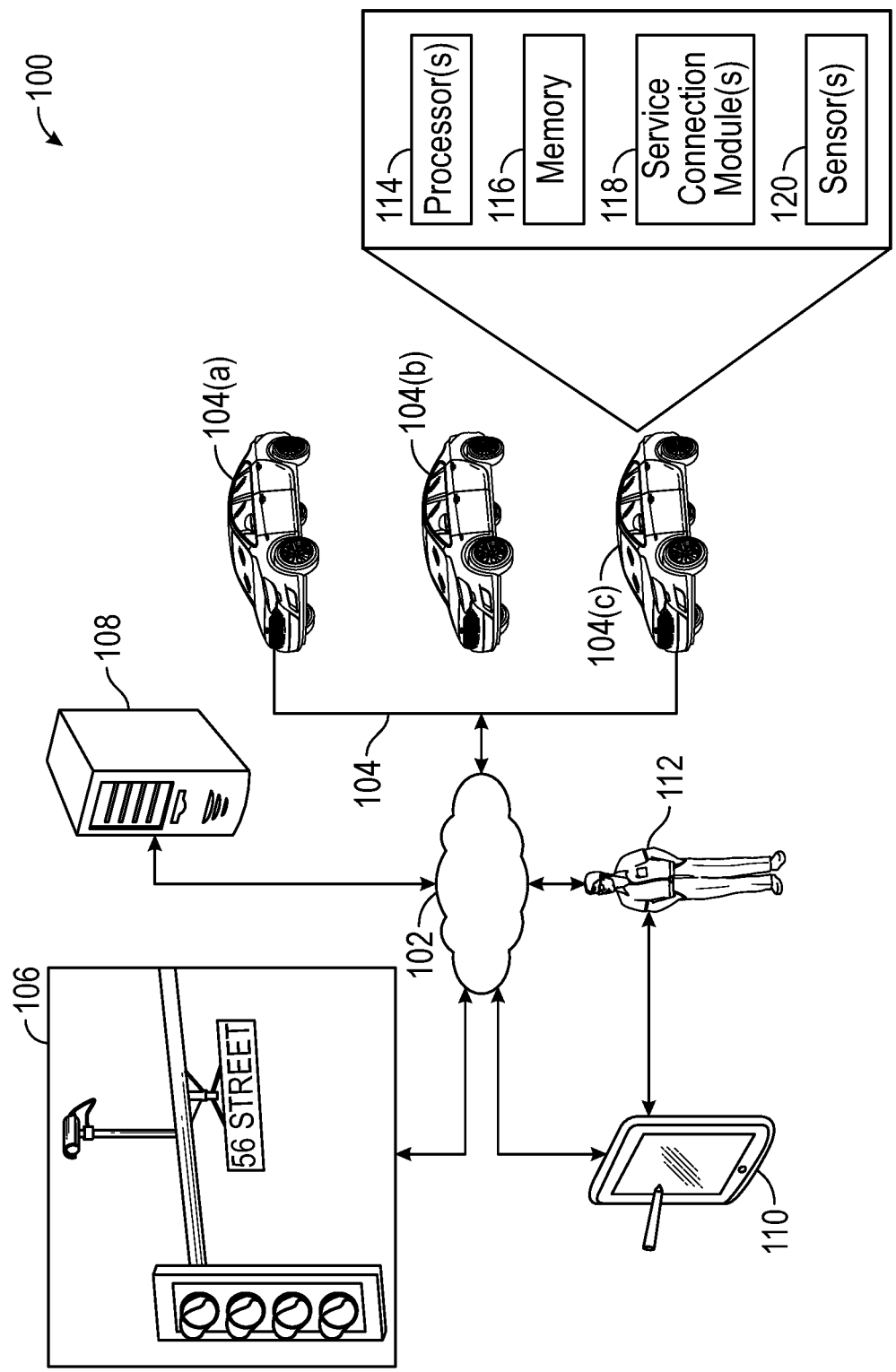
FIG. 1 depicts an illustrative architecture in accordance with one or more example embodiments of the disclosure.

The disclosure is directed to, among other things, systems and methods for dynamically connecting one or more transportation vehicles to a customer. In some embodiments, the transportation vehicle may be a ridehail vehicle. The customer may be connected to a ridehail vehicle based at least on the customer being identified through a digital identifier. Additionally, re-assignment of a different ridehail vehicle to the customer may be performed if more suitable ridehail vehicles exist.

In some embodiments, a customer may initiate a request for a ridehail service. For example a ridehail service may involve a customer being transported to an indicated destination location by a ridehail vehicle. The request may be for either an autonomous or a non-autonomous (operated by a driver) ridehail vehicle. The customer may initiate the request for the ridehail service through a mobile device, for example through a mobile device application. The customer may also initiate the request through any other suitable device, such as a desktop or laptop computer. The request may be sent to the ridehail service at a cloud platform, and/or the ridehail vehicle fleet itself, to name a few examples. The request may be used by the ridehail service to identify a suitable ridehail vehicle to connect to the customer.

The ridehail service may identify a suitable ridehail vehicle to connect to the customer based at least on a digital identifier of the customer. The digital identifier may be any form of data that may be used to identify an individual in an environment as being the customer who requested the ridehail service. For example, the digital identifier may be a facial recognition profile of the customer that may be identified through computer vision systems or other systems capable of performing facial recognition. As another example, a digital identifier may include information captured from a mobile device associated with the user. Such information may be in the form of a geolocation of the mobile device, a unique identifier associated with the mobile device such as a MAC address. Geolocation may be determined by any number of geopositioning methods, such as Global Positioning System (GPS), Wi-Fi triangulation, etc. In some alternative embodiments, the digital identifier may include the facial recognition determination, and additional information, such as the geolocation of the mobile device associated with the user, may be used to supplement the digital identifier to ensure an accurate identification of the customer. These are mere examples of a digital identifier and are not intended to be limiting.

In some embodiments, the data included in the digital identifier of the customer may be captured or obtained through a number of different sources. In some instances, the data may be captured by infrastructure and/or equipment located in the environment of the customer. For example, traffic cameras or other video capture devices may provide video feed that may be used to capture the data used to perform facial recognition on individuals within an environment to identify the customer requesting the ridehail service. In some instances, the data may also be captured by the ridehail vehicles themselves, for example through on-board cameras, sensors, or other data collection devices. In some instances, a combination of both data captured by infrastructure and/or equipment located in the environment and the ridehail vehicle may be used. Infrastructure and/or equipment located in the environment and any ridehail vehicles may share any captured data.

The digital identifier may be used by the ridehail service to connect the requesting customer to a ridehail vehicle. For example, the digital identifier information may be provided to, and/or used by the ridehail service to determine a location of the customer and a ridehail vehicle that is in closest proximity to the customer. In one scenario, a traffic camera at a certain intersection may capture an image of the user and that image may be used to perform facial recognition to determine that the user is located at that intersection. The ridehail service may then use this knowledge to connect a ridehail vehicle located at or nearby the intersection to the customer. The digital identifier may further serve to assist the ridehail vehicle and/or ridehail vehicle driver in locating the customer for pick-up. For example, facial recognition may be used to provide an indication to the ridehail vehicle and/or ridehail vehicle driver that an individual in the vicinity is the customer that is connected to the ridehail vehicle. The digital identifier may also be beneficial for use by ridehail vehicles to assist them in better locating a customer with a vision impairment. In these scenarios, the customer may not necessarily be able to identify the ridehail vehicle on their own through the typical methods (e.g., seeing the vehicle make/model, seeing a visual indicator on the vehicle in a particular color, etc.). The digital identifier may allow the ridehail vehicle to determine the location of the customer and also identify the customer in person when the ridehail vehicle is in proximity of the customer.

The digital identifier may also be beneficial because it may allow a ridehail pick-up to be performed without the customer needing to access their mobile device after initiating the ridehail service request (e.g., without having to remove their mobile device from their pocket). Instead, the ridehail vehicle itself would be able to use the digital identifier to locate the customer and travel towards the customer for pick-up (and/or the ridehail service may continuously reassign ridehail vehicles to the customer).

In some embodiments, the ridehail service, through the use of the digital identifier, may also be able to dynamically adapt to the customer's potentially changing location and connect the customer to a new ridehail vehicle that is more easily accessible to the customer if necessary. In this way, rapid re-assignment of ridehail vehicles to the customer may be possible to reduce the amount of time it takes for a customer to locate the ridehail vehicle they are connected to and vice versa. For example, in a scenario where a customer is leaving a sporting event and the traffic outside the sporting venue is congested. The customer may be connected to a first ridehail vehicle that is in the vicinity of the customer, but is either stuck in the congestion or is otherwise difficult for the customer to locate. The ridehail service may dynamically adapt to such a situation by continuously re-assigning the customer to vehicles that are more accessible. For example, a camera at a particular intersection may perform facial recognition and identify the customer is located at that intersection, and this digital identifier information may be used to reassign the customer to a ridehail vehicle closer in proximity to that particular intersection. Infrastructure and/or equipment in the environment as well as ridehail vehicles in the ridehail fleet may work individually or in combination (e.g., communicate information to one another) to capture information about users in the vicinity to determine the location and movement of the customer.

If the customer wants to remain connected to the ridehail vehicle they are currently assigned to, they may also have the capability to provide an indication to the ridehail service to cease reassignment (e.g., through a ridehail service application on the customer's mobile device). Regardless of whether the customer chooses to remain with the connected vehicle or accept dynamic reassignments, the ridehail service may further assist the customer in locating the ridehail vehicle to which they are assigned by providing walking directions to the current location of the connected ridehail vehicle.

Illustrative Embodiments

Turning now to the drawings, FIG. 1 depicts an illustrative architecture 100 in which techniques and structures of the present disclosure may be implemented. The illustrative architecture 100 may include a communications network 102, a transportation vehicle fleet 104 comprising a plurality of transportation vehicles such as example ridehail vehicles 104(a), 104(b), and 104(c), one or more data capture devices 106, a server 108, and one or more mobile devices 110, which may be operated by one or more users 112.

In some embodiments, the communications network 102 may include any one or a combination of multiple different types of networks, such as cable networks, the Internet, wireless networks, and other private and/or public networks. In some instances, the communications network 102 may include cellular (e.g., 5G), Wi-Fi, or Wi-Fi direct. In some embodiments, the network may involve communications between ridehail vehicles (e.g., 104(a), 104(b), and/or 104(c)) in the network and/or between ridehail vehicles in the network and elements external to the network. For example, Vehicle-to-Vehicle (V2V), Vehicle-to-Infrastructure (V2I), Vehicle-to-Everything (V2X), and/or Dedicated Short Range Communications (DSRC), to name a few, may be used.

In some embodiments, a ridehail vehicle 104(a) may comprise at least one or more processor(s) 114, memory 116, one or more service connection module(s) 118, and one or more sensor(s) 120. In some embodiments, the functionality of the module(s) described herein (for example, the service connection module(s) 118) may also be implemented as a single module or any other number of module(s). Any descriptions herein made with reference to ridehail vehicle 104(a) may similarly apply to any other ridehail vehicle, such as, for example, ridehail vehicle 104(b) or 104(c). The ridehail vehicle 104(a) may be autonomous or operated by a driver.

In some embodiments, the ridehail vehicle 104(a) may include one or more processors 114 that may include any suitable processing unit capable of accepting digital data as input, processing the input data based on stored computer-executable instructions, and generating output data. The computer-executable instructions may be stored, for example, in data storage and may include, among other things, operating system software and application software. The computer-executable instructions may be retrieved from the data storage and loaded into the memory 116 as needed for execution. The processor 114 may be configured to execute the computer-executable instructions to cause various operations to be performed. Each processor 114 may include any type of processing unit including, but not limited to, a central processing unit, a microprocessor, a microcontroller, a Reduced Instruction Set Computer (RISC) microprocessor, a Complex Instruction Set Computer (CISC) microprocessor, an Application Specific Integrated Circuit (ASIC), a System-on-a-Chip (SoC), a field-programmable gate array (FPGA), and so forth.

The memory 116 may be volatile memory (memory that is not configured to retain stored information when not supplied with power) such as random access memory (RAM) and/or non-volatile memory (memory that is configured to retain stored information even when not supplied with power) such as read-only memory (ROM), flash memory, and so forth. In various implementations, the memory 116 may include multiple different types of memory, such as various forms of static random access memory (SRAM), various forms of dynamic random access memory (DRAM), unalterable ROM, and/or writeable variants of ROM such as electrically erasable programmable read-only memory (EEPROM), flash memory, and so forth.

The service connection module(s) 118 may perform operations including at least receiving user identification information, wherein the user identification information comprises a digital identifier of a user, wherein the digital identifier is obtained by a video capture device located in an environment of a first ridehail vehicle and the user or a video capture device located on the first ridehail vehicle itself; and determining, based on the user identification information, a first ridehail vehicle of one or more ridehail vehicles to assign to the user. The service connection module(s) 118 may also perform any of the other operations described herein.

The sensors 120 may include any sensors for capturing data in the environment of the ridehail vehicle 104(a), including, for example, audio sensors, video sensors, accelerometers, gyroscopes, temperature sensors, proximity sensors, LIDAR, etc. The information captured by the sensors 120 may be used in a number of different ways. For example, the information may be used by the vehicle to navigate throughout its environment. As another example, the information may be used by the service connection module 118 of ridehail vehicle 104(a) to locate a user 112 based on a digital identifier of the user 112.

In some embodiments, a data capture device 106 may refer to a device located in an environment of the user 112 and/or the ridehail vehicle 104(a). For example, the data capture device 106 may be in the form of a traffic or other type of camera, a microphone or other audio capture device, or any other type of device that is capable of capturing data. In some instances, the data capture device 106 may be used to capture digital identifier information of the user 112. For example, the data capture device 106 may capture video feed of the user 112, and the video feed may be used to perform facial recognition of the user 112. In some instances, the data capture device 106 may also be used to supplement data captured by the ridehail vehicle 104(a). For example, the ridehail vehicle 104(a) may also capture data from its sensors 120, and may use the sensor data as well as the data captured by the data capture device 106 to perform ridehail service functions (e.g., involving identifying a user for pick-up based on a digital identifier of the user). In some instances, numerous data capture devices 106 may be capturing data within an environment and may be in communication to share the data with one another. In some instances, multiple ridehail vehicles 104(a) within the ridehail vehicle fleet 104 may also be capturing data and sharing the data with one another. In some instances, some or all of the numerous data capture devices 106 and/or ridehail vehicles 104(a) may be capturing data and sharing such data with one another. This may allow the ridehail service to have a ubiquitous data representation of an environment to properly track the user 112 and determine an appropriate ridehail vehicle 104(a) to assign to the user 112 at a given time and location.

In some embodiments, a server 108 may serve as a remote cloud platform for performing any of the functionality described herein, such as the operations with respect to a ridehail vehicle (e.g., 104(a)) of the ridehail vehicle fleet 104.

In some embodiments, the mobile device 110 may be operated by the user 112 to request a ridehail service from a ridehail vehicle 104(a) of the ridehail vehicle fleet 104. The mobile device 110 may also provide data used in forming or supplementing the formation of the digital identifier for the user 112. For example, the geolocation of the phone may provide an indication of the current location of the user 112.

Figure 2:
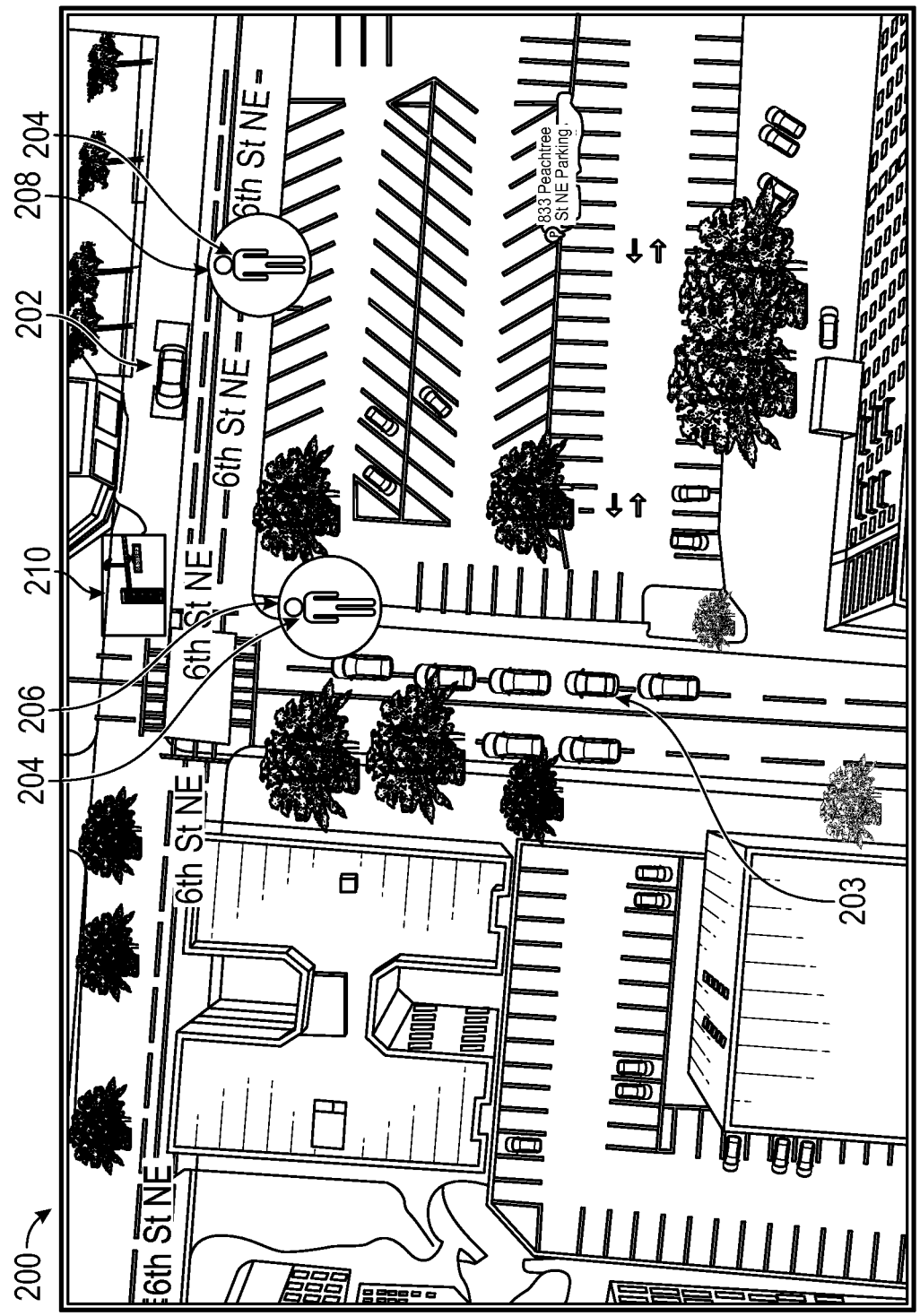
FIG. 2 depicts a visualization of an example environment including ridehail vehicle(s) and a customer in accordance with one or more example embodiments of the disclosure.

FIG. 2 depicts a visualization of an example environment 200 including ridehail vehicle(s) 202 and 204 (which may be, for example, the same as ridehail vehicles 104(a), 104(b), and/or 104(c)) and a user 204 (which may be, for example, the same as the user 112). FIG. 2 illustrates that the user 204 may initially be at a first location 206 and may be connected through a ridehail service with a first ridehail vehicle 204 that is in closest proximity to the user 204 at the first location 206 of the environment 200. The user 204 may then travel to a second location 208 in the environment 200. The ridehail service may determine that a second ridehail vehicle 202 is now in closer proximity to the user 204, and may reassign the second ridehail vehicle 202 to the user instead of the first ridehail vehicle 204. The assignments may be performed by identifying the user 204 through a digital identifier. The digital identifier may be formed using any of the information described herein. For example, a video capture device 210 may capture video feed of the user 204 to perform facial recognition on the user 204. The user 204 may then enter the second ridehail vehicle 202 and proceed with the ridehail service transport.

Figure 3:
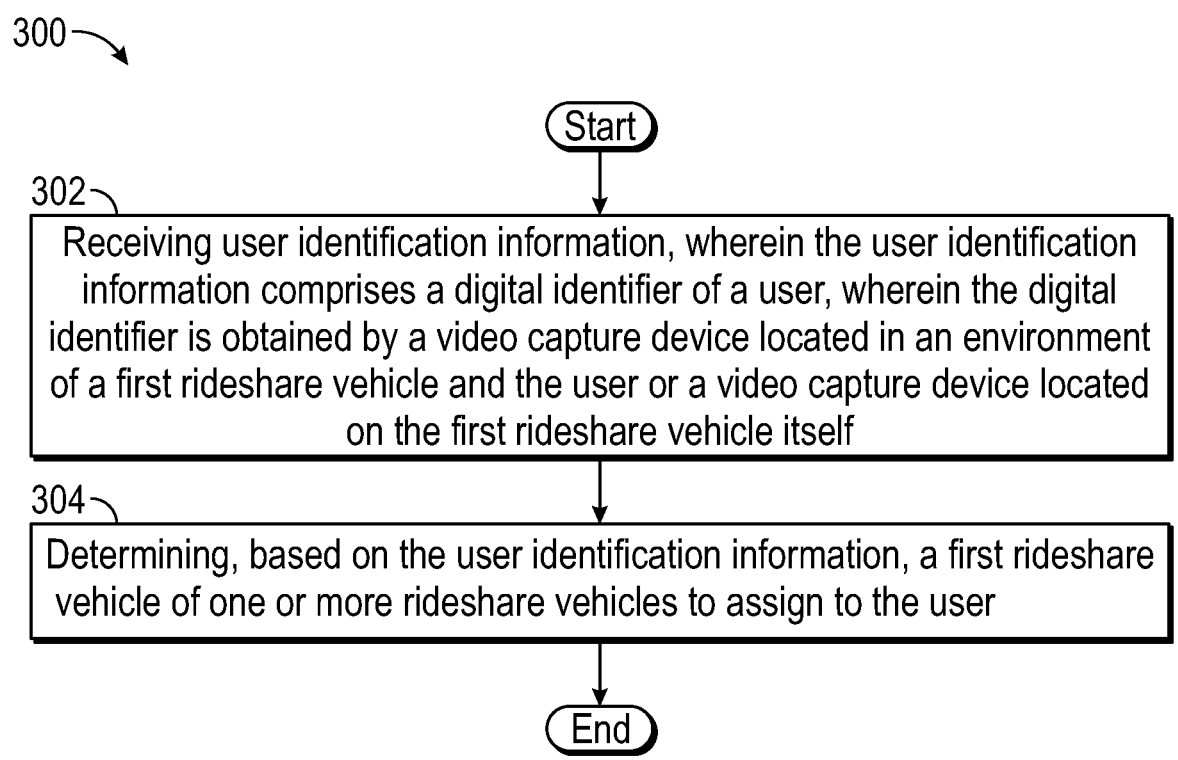
FIG. 3 depicts a flowchart of an example method in accordance with one or more example embodiments of the disclosure.

FIG. 3 is a flowchart of an example method of the present disclosure. In some embodiments, the method includes an operation 302 of receiving user identification information, wherein the user identification information comprises a digital identifier of a user, wherein the digital identifier of a user, wherein the digital identifier is obtained by a video capture device located in an environment of a first ridehail vehicle and the user or a video capture device located on the first ridehail vehicle itself. The digital identifier may be any form of data that may be used to identify an individual in an environment as being the customer who requested the ridehail service. For example, the digital identifier may be a facial recognition profile of the customer that may be identified through computer vision systems or other systems capable of performing facial recognition. Such facial recognition may be performed by any number of video and/or image capture devices, such as traffic cameras located at an intersection. As another example, a digital identifier may include information captured from a mobile device associated with the user. Such information may be in the form of a geolocation of the mobile device, a unique identifier associated with the mobile device such as a MAC address.

In some embodiments, the method includes an operation 304 of determining, based on the user identification information, a first ridehail vehicle of one or more ridehail vehicles to assign to the user. The first ridehail vehicle may be the closest ridehail vehicle to the current location of the user, where the location of the user may be determined based on the user identification information. For example, a traffic camera located at a particular intersection may capture an image or video feed of the user and determine that the user is located at the intersection. Based on this information, a ridehail vehicle may be assigned that is located closest to the intersection. The ridehail vehicle assignment may also be dynamic, such that new ridehail vehicles may be assigned to the user based on the changing location of the user and/or ridehail vehicles in the area. For example, the user may walk to a new location and the new location may be closer to a second ridehail vehicle. The user may then be reassigned to the second ridehail vehicle. As another example, the first ridehail vehicle may be stuck in traffic, and a second ridehail vehicle may come into a closer proximity to the first user, so the second ridehail vehicle may be reassigned to the user. This dynamic reassignment of ridehail vehicles may increase the efficiency of users meeting their assigned ridehail vehicles.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, one skilled in the art will recognize such feature, structure, or characteristic in connection with other embodiments whether or not explicitly described.

Implementations of the systems, apparatuses, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that stores computer-executable instructions is computer storage media (devices). Computer-readable media that carries computer-executable instructions is transmission media. Thus, by way of example, and not limitation, implementations of the present disclosure can comprise at least two distinctly different kinds of computer-readable media: computer storage media (devices) and transmission media.

Computer-executable instructions comprise, for example, instructions and data which, when executed at a processor, cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described exemplary embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A system comprising:
   one or more ridehail vehicles;
   a mobile device;
   at least one processor; and
   at least one memory storing computer-executable instructions, that when executed by the at least one processor, cause the at least one processor to:
      receive, through a ridehail application, a request for a ridehail trip associated with a user;
      receive a digital identifier of the user at a first current location of the user, wherein the digital identifier is obtained by a first video capture device located in (1) an environment of the one or more ridehail vehicles and the user and (2) a second video capture device located on or within the one or more ridehail vehicles;
      determine, based on the first current location, a first ridehail vehicle of the one or more ridehail vehicles to assign to the user;
      receive an updated digital identifier of the user at a second current location from a third video capture device at the second current location and a fourth video capture device located on or within a ridehail vehicle that is unassigned to the user and at the second current location, the updated digital identifier including at least a facial recognition determination at the second current location;
      determine that a second ridehail vehicle of the one or more ridehail vehicles is capable of reaching the user at the second current location of the user before the first ridehail vehicle; and
      dynamically re-assign, without requiring user input to the ridehail application, based on the updated digital identifier and the determination that the second ridehail vehicle is capable of reaching the second current location of the user before the first ridehail vehicle, the second ridehail vehicle to the user, wherein the second ridehail vehicle replaces the first ridehail vehicle.

2. The system of claim 1, wherein the facial recognition determination comprises a first facial recognition determination, and wherein the digital identifier of the user is based on a second facial recognition determination at the first current location, and wherein the first facial recognition determination and the second facial recognition determination are associated with the user traveling from the first current location to the second current location.

3. The system of claim 2, wherein the first current location of the user is verified by a geolocation of the mobile device, wherein the mobile device is associated with the user.

4. The system of claim 1, wherein the computer-executable instructions further cause the at least one processor to:
determine navigation instructions, wherein the navigation instructions provide an indication of a walking path for the user to take in order to reach the first ridehail vehicle.

5. The system of claim 1, wherein the computer-executable instructions further cause the at least one processor to:
receive an indication from the user to cease reassignment; and
assign the first ridehail vehicle to the user.

6. The system of claim 1, wherein the computer-executable instructions further cause the at least one processor to:
perform dual authentication of the user, wherein dual authentication comprises verifying two types of user identification data including at least the digital identifier of the user, a first geolocation of the mobile device, a mobile device identification number, or biometric information for the user.

7. The system of claim 1, wherein the computer-executable instructions further cause the at least one processor to:
determine, while the user is still at the second current location, that a third ridehail vehicle of the one or more ridehail vehicles is capable of reaching the user at the second current location of the user before the first ridehail vehicle and the second ridehail vehicle, and
dynamically re-assign, without requiring user input, based on the updated digital identifier and the determination that the third ridehail vehicle is capable of reaching the second current location of the user before the first ridehail vehicle and the second ridehail vehicle. the third ridehail vehicle to the user, wherein the third ridehail vehicle replaces the second ridehail vehicle.

8. The system of claim 7, wherein determine that the third ridehail vehicle of the one or more ridehail vehicles is capable of reaching the user at the second current location of the user before all other ridehail vehicles of the one or more ridehail vehicles.

9. A method comprising:
receiving, through a ridehail application, a request for a ridehail trip associated with a user;
receiving a digital identifier of the user at a first current location of the user, wherein the digital identifier is obtained by a first video capture device located in (1) an environment of one or more ridehail vehicles and the user and (2) a second video capture device located on the one or more ridehail vehicles;
determining, based on the first current location, a first ridehail vehicle of the one or more ridehail vehicles to assign to the user;
receiving an updated digital identifier of the user at a second current location from a third video capture device associated with infrastructure at the second current location and a fourth video capture device located on or within a ridehail vehicle that is unassigned to the user and at the second current location, the updated digital identifier including at least a facial recognition determination at the second current location;
determining that a second ridehail vehicle of the one or more ridehail vehicles is capable of reaching the user at the second current location of the user before the first ridehail vehicle; and
dynamically re-assigning, without requiring user input to the ridehail application, based on the updated digital identifier and the determination that the second ridehail vehicle is capable of reaching the second current location of the user before the first ridehail vehicle, the second ridehail vehicle to the user, wherein the second ridehail vehicle replaces the first ridehail vehicle.

10. The method of claim 9, wherein the facial recognition determination comprises a first facial recognition determination, and wherein the digital identifier of the user is based on a second facial recognition determination at the first current location, and wherein the first facial recognition determination and the second facial recognition determination are associated with the user traveling from the first current location to the second current location.

11. The method of claim 10, wherein the first current location of the user is verified by a first geolocation of a mobile device, wherein the mobile device is associated with the user.

12. The method of claim 9, further comprising:
sending navigation instructions, wherein the navigation instructions provide an indication of a walking path for the user to take in order to reach the first ridehail vehicle.

13. The method of claim 9, further comprising:
receiving an indication from the user to cease reassignment; and
assigning the first ridehail vehicle to the user.

14. The method of claim 9, further comprising:
performing dual authentication of the user, wherein dual authentication comprises verifying two types of user identification data including at least the digital identifier of the user, a first geolocation of a mobile device, a mobile device identification number, or biometric information for the user.

15. A system comprising:
one or more ridehail vehicles;
a mobile device;
at least one processor; and
at least one memory storing computer-executable instructions, that when executed by the at least one processor, cause the at least one processor to:
receive, from a mobile device, a request for a ridehail transportation service;
determine a first current location of a user requesting the ridehail transportation service, wherein a location of the user is determined through a first digital identifier, wherein the first digital identifier comprises at least a first facial recognition determination performed by a first video capture device in an environment of the user and a second video capture device located on or within one or more ridehail vehicles;
determine, based on the first current location of the user, a first ridehail vehicle to assign to perform the ridehail transportation service;
determine, based on a second digital identifier for the user, a second current location of the user, wherein the second current location is different than the first current location, and wherein the second digital identifier comprises a second facial recognition determination performed by a third video capture device associated with infrastructure at the second current location and a fourth video capture device located on or within a ridehail vehicle that is unassigned to the user and at the second current location;

determine that a second ridehail vehicle of the one or more ridehail vehicles is capable of reaching the user at the second current location of the user before the first ridehail vehicle; and dynamically re-assign, without requiring user input to the mobile device, based on the second current location of the user, and the determination that the second ridehail vehicle is capable of reaching the second current location of the user before the first ridehail vehicle the second ridehail vehicle to assign to perform the ridehail transportation service.

16. The system of claim 15, wherein the computer-executable instructions further cause the at least one processor to:

perform dual authentication of the user, wherein dual authentication comprises verifying two types of user identification data including at least a second facial recognition of a user, a second geolocation of the mobile device, a mobile device identification number, or biometric information for the user.

17. The system of claim 15, wherein the computer-executable instructions further cause the at least one processor to:

send navigation instructions to the mobile device, wherein the navigation instructions provide an indication of a walking path for the user to take in order to reach the second ridehail vehicle.

* * * * *